Feb. 22, 1949.   W. T. NARDIN   2,462,762
GASKET CENTERING MEANS
Filed Oct. 19, 1944   3 Sheets-Sheet 1

Inventor
William T. Nardin
By Joseph Rusom
Attorney.

Feb. 22, 1949.                     W. T. NARDIN                      2,462,762
                                GASKET CENTERING MEANS
Filed Oct. 19, 1944                                           3 Sheets-Sheet 2
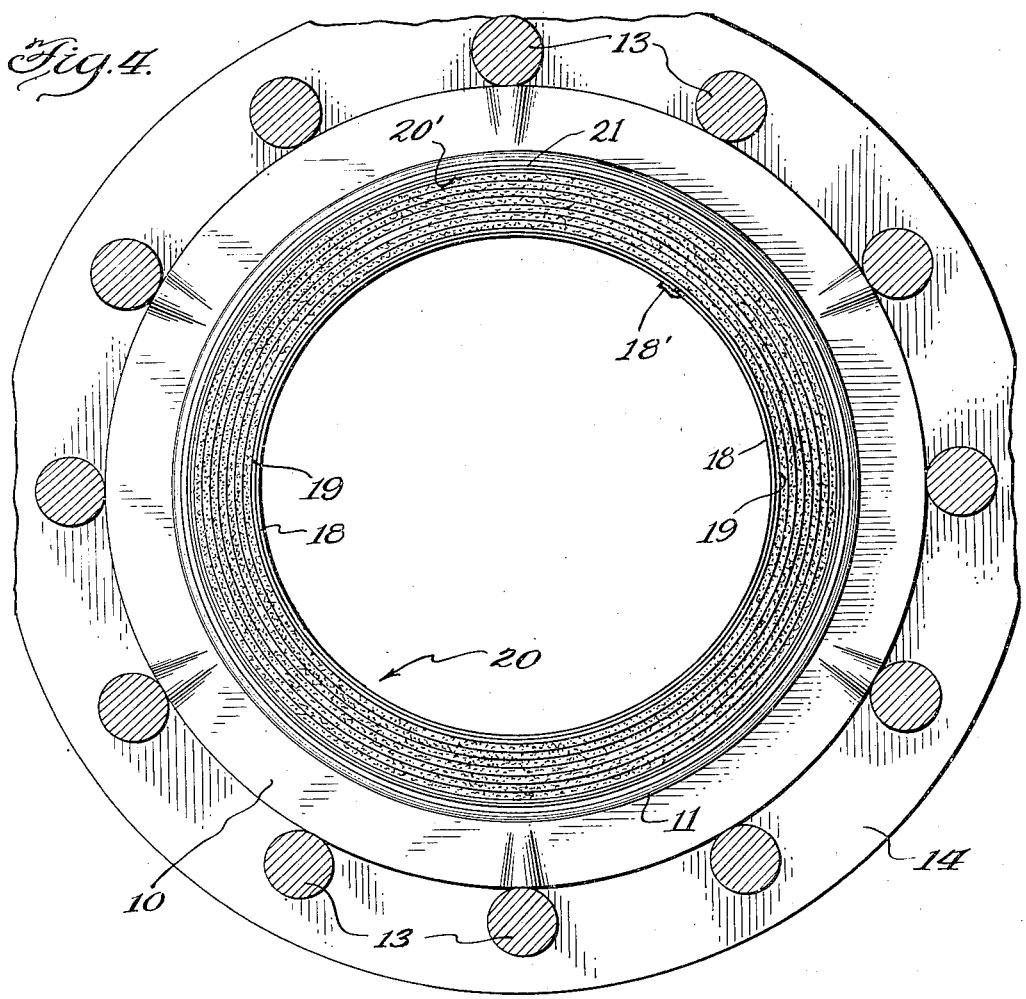
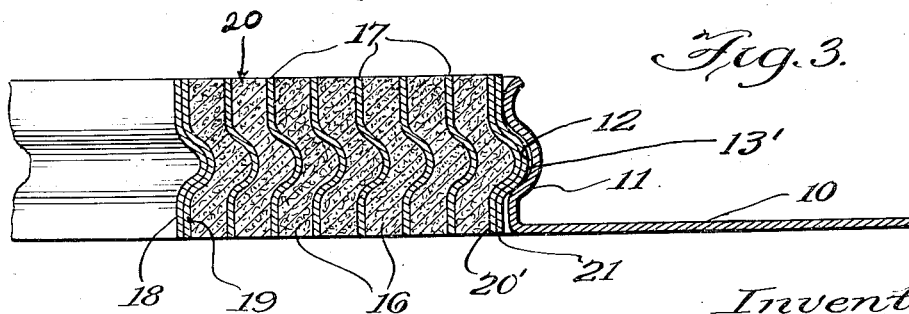
Inventor
William T. Nardin
By Joseph Rossman
           Attorney.

Feb. 22, 1949.  W. T. NARDIN  2,462,762
GASKET CENTERING MEANS
Filed Oct. 19, 1944  3 Sheets-Sheet 3
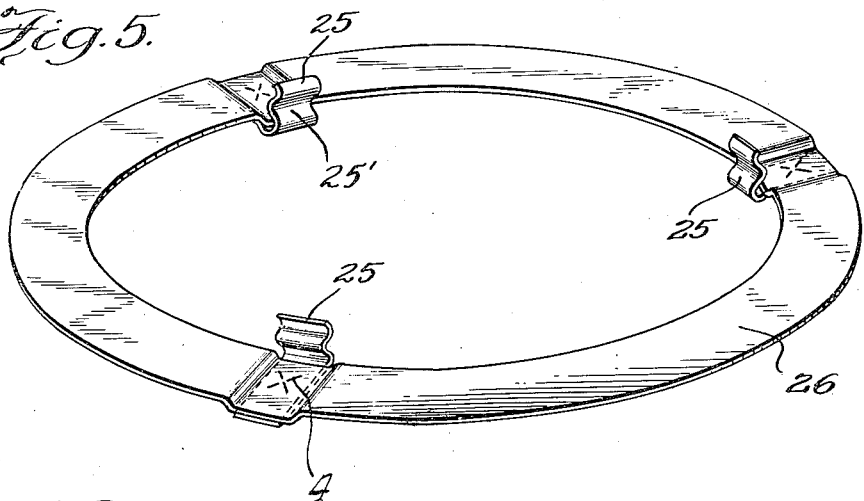
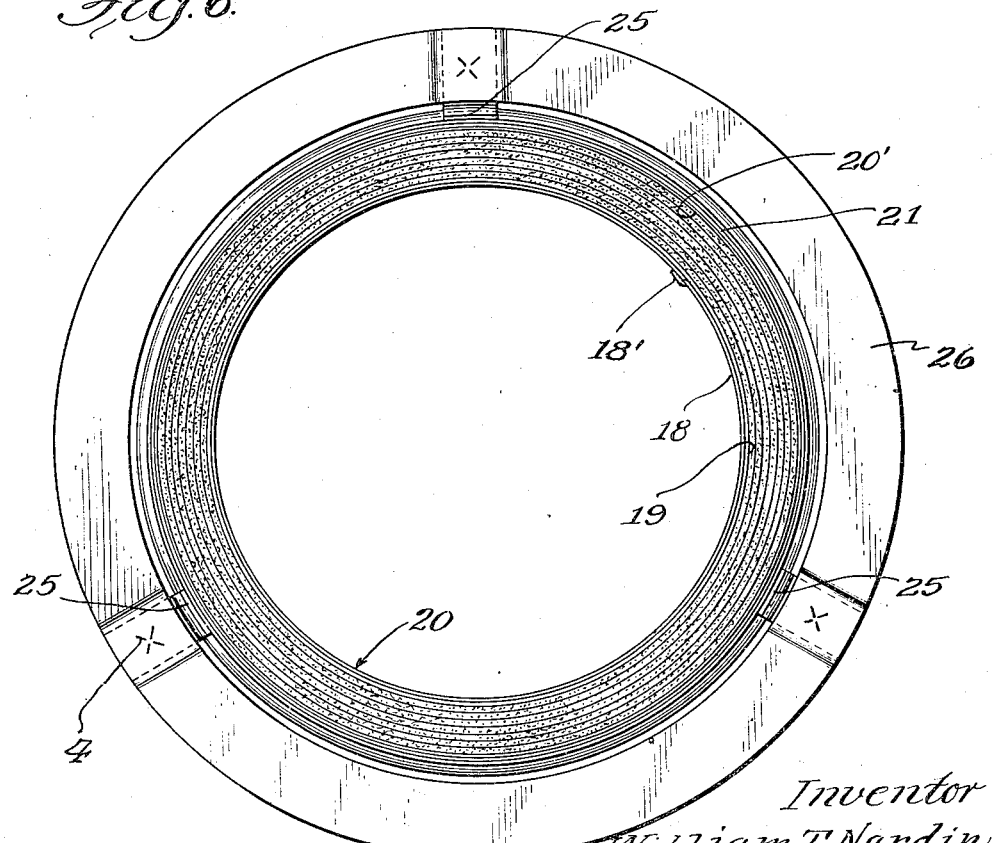

Patented Feb. 22, 1949

2,462,762

UNITED STATES PATENT OFFICE 2,462,762

GASKET CENTERING MEANS

William T. Nardin, Moorestown, N. J., assignor to United States Gasket Company, Camden, N. J., a corporation of New Jersey Application October 19, 1944, Serial No. 559,455

5 Claims. (Cl. 288—27)

This invention relates to centering ring means for receiving and retaining gaskets in order to facilitate positioning the gaskets between pipe flanges, manhole covers and other places where gaskets have to be accurately positioned.

For the purpose of illustrating the invention, there is shown in the accompanying drawings forms thereof which are at present preferred, since the same have been found in practice to give satisfactory and reliable results, although it is to be understood that the various instrumentalities of which the invention consists can be variously arranged and organized and that the invention is not limited to the precise arrangements and organizations of the instrumentalities as herein shown and described.

Figure 1:
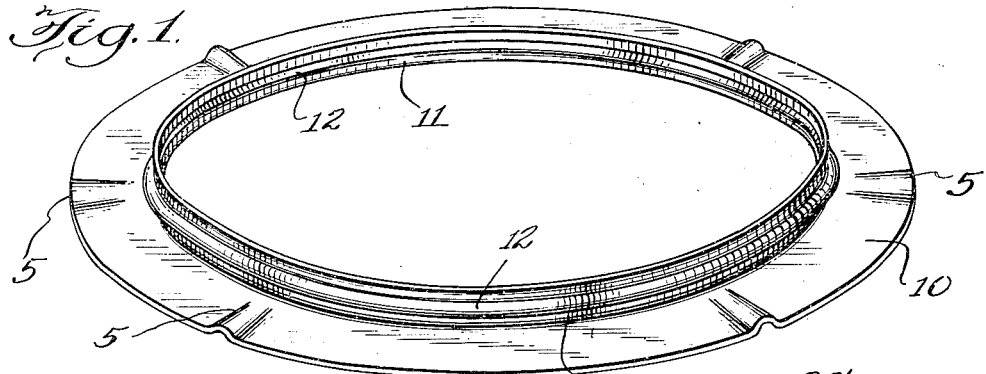
Figure 2:
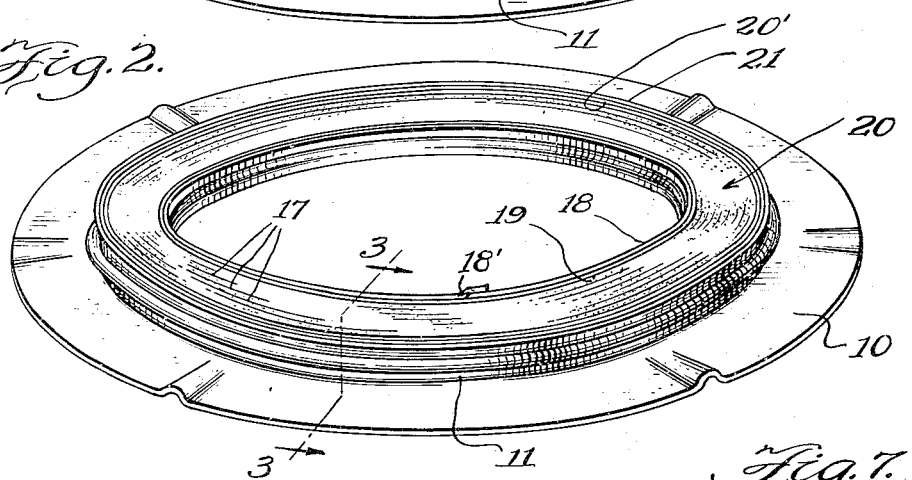

Figure 1 is a perspective view of a gasket centering ring constructed of sheet metal in accordance with my invention, Figure 2 is a perspective view of the centering ring illustrated in Figure 1, having a gasket received and retained therein, Figure 3 is an enlarged sectional view taken on lines 3—3 of Figure 2.

Figure 7:
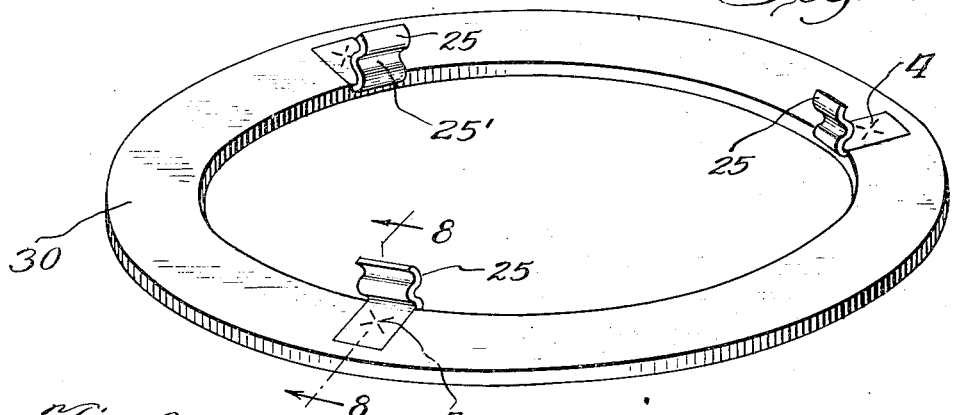
Figure 8:
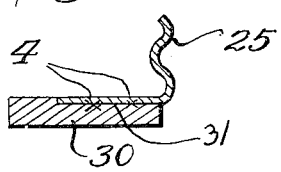

Figure 4 is a plan view partly in section of the centering ring and gasket assembly illustrated in Figure 2 and positioned between pipe flanges, Figure 5 is a perspective view of a modified form of construction of my centering ring, Figure 6 is a plan view of an assembly of a gasket and centering ring shown in Figure 5, Figure 7 is a construtcion of a rigid metal gauge ring provided with means for retaining a gasket, and Figure 8 is a sectional view taken on lines 8—8 of Figure 7.

Referring to the drawings, the centering ring illustrated in Figure 1 is constructed integrally of relatively flexible sheet metal of suitable thickness. It consists of a continuous substantially flat ring portion 10 and a circular collar portion 11 integral therewith. The ring portion may be provided with spaced crimps 5 in order to compensate for excess sheet metal during the shaping operation when the ring is formed from an initial flat metal blank.

The collar portion 11 extends vertically upwardly from one face of the ring at the inner periphery thereof and is provided with a continuous annular channel or bead 12 for receiving and retaining a complementally shaped bead portion 12 of a gasket 20 as illustrated in Figure 3.

The gasket 20 may be of any conventional construction and may be formed, for example, of a spirally wound steel strip 17 having a cross-sectional contour as shown in Figure 3. An asbestos tape is interposed between the metal convolutions, the innermost metal convolutions 18 and 19 and the outermost metal convolutions $20^1$ and 21 having no asbestos tape therebetween. The inner diameter of the collar portion 11 is substantially equal to the outer diameter of the gasket 20 so that when the gasket and centering ring are assembled, as shown in Figure 2, the bead portion $13^1$ of the gasket will frictionally engage and interfit with the complementally shaped channel 12 of the collar portion. The centering ring being made of relatively flexible metal is sufficiently resilient and yielding to readily receive and snugly retain the gasket even though the gasket may be slightly larger or smaller than standard dimensions.

The assembled centering ring and gasket are adapted to be positioned between the flanges 14 of abutting pipe sections as illustrated in Figure 4, the outer periphery of the ring 10 abutting the bolts 13.

A modified construction of my centering ring is illustrated in Figure 5, which is formed from a relatively thin flexible ring portion 26 having brackets 25 spot welded thereto at spaced intervals as indicated by numeral 4. The brackets 25 are provided with channel portions $25^1$ for engaging and retaining complemental portions of a gasket 20 as illustrated in Figure 6.

In Figures 7 and 8, there is illustrated a rigid metal gauge ring 30 of substantial thickness which is channelled at 31 to receive brackets 25. The legs of the brackets are spot welded to the ring at 4 and do not project above the plane surface of the ring as shown in Figure 8. A gasket is adapted to be positioned and retained by the gauge ring in the manner as shown in Figure 6.

Centering rings made in accordance with my invention can be manufactured at low cost and provide very convenient means for accurately positioning gaskets wherever they must be positioned between joints of pipe flanges, manhole covers and the like.

The present invention may be embodied in other specific forms without departing from the spirit or essential attributes thereof, and it is therefore desired that the present embodiments be considered in all respects as illustrative and not restrictive, reference being had to the appended claims rather than to the foregoing description to indicate the scope of the invention.

I claim:

1. A centering ring for receiving and retaining gaskets comprising a flat ring portion and a collar portion extending vertically from only one face of said flat ring portion at the inner periphery thereof, said collar portion having a channel parallel to said periphery and being dimensioned and contoured to receive and retain a gasket at its inner face.

2. A centering ring for receiving and retaining gaskets comprising a flat ring portion and a continuous circular collar portion extending upwardly from only one face of said flat ring portion at the inner periphery thereof, said collar portion having a channel parallel to said periphery and being dimensioned and contoured to receive and retain a gasket at its inner face.

3. A centering ring for receiving and retaining gaskets comprising a flat ring portion and a collar portion extending upwardly from only one face of said flat ring portion at the inner periphery thereof, said collar portion being provided at the inner face thereof with a peripherally extending continuous channel adapted for receiving and retaining complementally engaging portions of a gasket therein, said collar portion being dimensioned and contoured to receive and retain a gasket at its inner face.

4. A centering ring for receiving and retaining a gasket comprising a flat metal ring, the inner diameter of said ring having substantially the diameter of a gasket to be retained by said ring, spaced brackets positioned adjacent the inner periphery of said ring having a channel parallel to said periphery for frictionally embracing and retaining a gasket positioned at the inner periphery of said ring.

5. A centering ring for receiving and retaining a gasket comprising a flat metal ring, the inner diameter of said ring having substantially the diameter of a gasket to be retained by said ring, retaining means extending vertically from only one face of said ring provided at the inner periphery thereof and having a channel parallel to said periphery for frictionally embracing and retaining a gasket positioned at the inner periphery of said ring.

WILLIAM T. NARDIN.

REFERENCES CITED

The following references are of record in the file of this patent:

UNITED STATES PATENTS

| Number | Name | Date |
|---|---|---|
| 761,325 | Schier et al. | May 31, 1904 |
| 1,856,051 | Fryling | Apr. 26, 1932 |
| 1,942,704 | Hubbard et al. | Jan. 9, 1934 |
| 2,027,299 | Bohmer | Jan. 7, 1936 |
| 2,128,640 | Fenton | Aug. 30, 1938 |
| 2,140,442 | Clark | Dec. 13, 1938 |
| 2,200,212 | Bohmer | May 7, 1940 |
| 2,339,479 | McCreary | Jan. 18, 1944 |